United States Patent [19]
Tanaka

[11] Patent Number: 6,160,827
[45] Date of Patent: Dec. 12, 2000

[54] LASER IRRADIATING DEVICE AND LASER IRRADIATING METHOD

[75] Inventor: Koichiro Tanaka, Kanagawa, Japan

[73] Assignee: Semiconductor Energy Laboratory, Co., Ltd., Japan

[21] Appl. No.: 09/032,970

[22] Filed: Mar. 2, 1998

[30] Foreign Application Priority Data

Feb. 28, 1997 [JP] Japan .................................... 9-061781

[51] Int. Cl.[7] ................................ H01S 3/10; H01S 3/22; H01S 3/08; H01L 21/00
[52] U.S. Cl. ................................ 372/24; 372/25; 372/57; 372/101; 438/166
[58] Field of Search ............................. 372/24, 101, 325, 372/57; 438/166

[56] References Cited

U.S. PATENT DOCUMENTS

| | | | |
|---|---|---|---|
| 3,667,832 | 6/1972 | Kitano et al. | 350/175 |
| 4,309,225 | 1/1982 | Fan et al. | 168/1.5 |
| 4,439,245 | 3/1984 | Wu | 148/1.5 |
| 4,475,027 | 10/1984 | Pressley | 219/121 |
| 4,497,015 | 1/1985 | Konno et al. | 362/268 |
| 4,733,944 | 3/1988 | Fahlen et al. | 350/167 |
| 4,769,750 | 9/1988 | Matsumoto et al. | 362/268 |
| 5,097,291 | 3/1992 | Suzuki | 355/69 |
| 5,263,250 | 11/1993 | Nishiwaki et al. | 29/890.1 |
| 5,307,207 | 4/1994 | Ichihara | 359/622 |
| 5,561,081 | 10/1996 | Takenouchi et al. | 437/174 |
| 5,858,822 | 1/1999 | Yamazaki et al. | 438/166 |

OTHER PUBLICATIONS

Pennington, et al., "CCD Imaging Array Combining Fly's–Eye Lens with TDI for Increased Light–Gathering Ability"; IBM Technical Disclosure Bulletin, vol. 21(2); pp. 857–858, 1978.

Turner, et al. "Gas Immersion Laser Diffusion For Efficient Cell Fabricating And Grain Boundary Research"; 16th IEEE Photovoltaic Specialist Conference—1982; pp. 775–780, San Diego, CA, 27–30, Sep., 1982.

Primary Examiner—Frank G. Font
Assistant Examiner—Armando Rodriguez
Attorney, Agent, or Firm—Fish & Richardson P.C.

[57] ABSTRACT

To restrain nonuniformity of irradiation when a linear laser beam is irradiated by scanning the beam, linear laser pulses are irradiated by scanning the pulses in an oblique direction by which irradiation is carried out without overlapping peaks periodically present in the longitudinal direction of the linear laser beam and accordingly, nonuniformity of irradiation can be restrained.

21 Claims, 14 Drawing Sheets

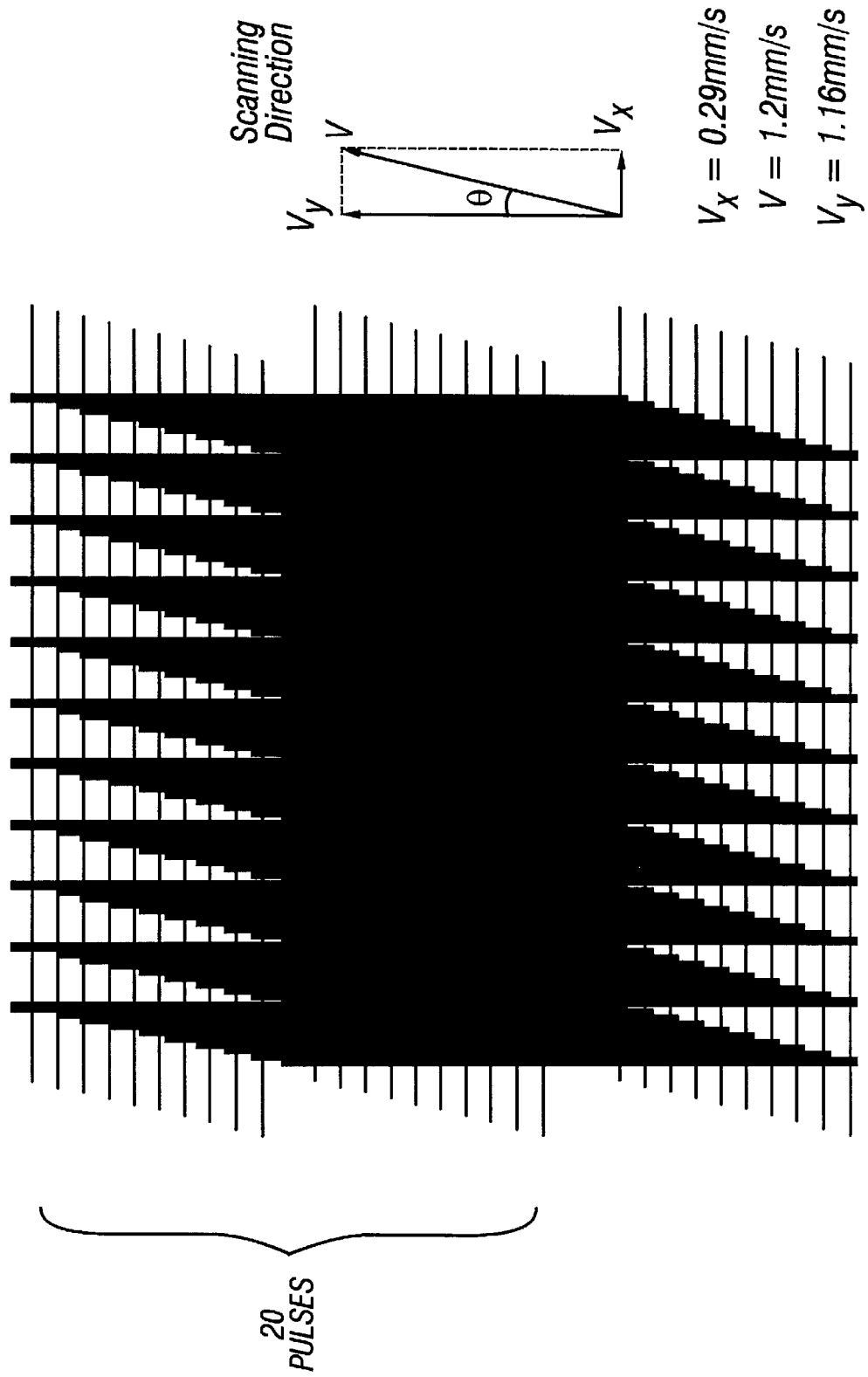

LASER IRRADIATING DEVICE AND LASER IRRADIATING METHOD

FIELD OF THE INVENTION

The present invention disclosed in the specification relates to a method and a device of irradiating laser beam by scanning the laser beam which is fabricated in a linear shape.

The present invention disclosed in the specification can be utilized in exposure technology in laser annealing technology and photolithography steps in respect of, for example, a semiconductor.

BACKGROUND OF THE INVENTION

In recent years, researches are carried out widely on the technology in which an amorphous semiconductor film or a crystalline semiconductor film (semiconductor film having crystallinity of not single crystal but polycrystal, microcrystal or the like) formed over an insulating substrate of glass or the like, that is, a non single crystal silicon film, is crystallized or the crystallinity is promoted by performing laser annealing. A silicon film is frequently used for the semiconductor film.

A glass substrate is inexpensive and rich in workability compared with a quartz substrate that has been conventionally used frequently, and is provided with an advantage of capable of easily fabricating a substrate having a large area. This is the reason for carrying out the above-described researches. Further, laser is preferably used for crystallization because in the laser process, a substrate is not heated and the process is suitable for using a glass substrate having low heat resistance.

A crystalline silicon film formed by performing laser annealing is provided with high mobility. When such a crystalline silicon film is used, TFTs (Thin Film Transistor) for driving pixel and for drive circuit can be integrated on one sheet of glass substrate.

Generally, the laser spot of laser beam is provided with dimensions of several centimeters or less, respectively, and therefore, a special device is needed in carrying out processing in respect of a large area.

Generally, pulse laser beam of excimer laser or the like is fabricated by an optical system such that a square spot of several centimeters square is formed and the laser beam is scanned (irradiated position of laser beam is moved relatively with respect to the irradiated face) thereby performing laser annealing.

Further, there is known a technology where laser beam is fabricated into a linear shape (several millimeters width)× (several tens centimeters) and irradiated while being scanned in a direction of a width of the linear beam.

When the method is used, different from the case where laser beam having a spot-like shape in which scanning in the forward and rearward direction and the left and right direction is needed, is used, the laser irradiation can be carried out on an entire irradiated face by scanning the linear laser only in a direction orthogonal to the linear direction and high productivity can be achieved.

Although the method of performing laser annealing in respect of a non single crystal semiconductor film by scanning the pulse laser beam fabricated in the above-described linear shape, is a method excellent in the productivity, several problems have been posed.

One of particularly serious problems among them is that laser annealing cannot be performed uniformly over the entire film surface.

When the linear laser began to be used, a phenomenon where stripes were formed at portions of overlapping linear beams was caused significantly and characteristics of a semiconductor considerably differed among the stripes.

FIG. 1a shows an optical photograph of a crystalline silicon film provided when the laser beam (KrF excimer laser) having a linear shape extending in the transverse direction of paper face is irradiated by scanning the beam from bottom toward top of paper face.

As apparent from FIG. 1a, stripe patterns are observed at portions where linear beams overlap. The stripe patterns reflect a difference in crystallinity in the film.

When a liquid crystal display is fabricated by using, for example, the film shown by FIG. 1a, there causes inconvenience where the stripes are shown on the screen as they are.

The reason is that a variation in the characteristic of the fabricated TFT emerges by reflecting a difference in crystallinity in the film having stripes as shown by FIG. 1a.

It can be reduced to a nonproblematic level by devises as follows.

(1) Improvement of an non single crystal semiconductor film that is an object of irradiating laser is improved.

(2) Making a scan pitch (interval between contiguous linear laser beams) of a linear laser fine.

(3) Pursuit of an optimum combination of parameters determining various irradiating conditions. For example, a combination of parameters of scan pitch of linear laser, scan speed, pulse oscillation interval, irradiation energy density and the like is optimized.

When the above-described stripe patterns were made inconspicuous, the nonuniformity of energy distribution of the laser beam per se began conspicuous.

Generally, when the linear laser beam is formed, a beam originally having a rectangular shape is fabricated into that of the linear shape by passing the beam through pertinent lens groups.

The aspect ratio of the beam having a rectangular shape falls in a range of about 2 through 5 and the beam is deformed into a linear beam having an aspect ratio of 100 or higher by lens groups (referred to as beam homogenizer).

In this case, the lens groups are designed to homogenize simultaneously the energy distribution in the beam. According to the method of making uniform the energy distribution, the original rectangular beam is divided and thereafter, the divided portions of the beam are respectively magnified and overlapped to homogenize the beam.

In respect of the beam which has been divided and reconstructed by such a method, apparently, the finer the division the more uniform the energy seems to be distributed.

However, when the beam is actually irradiated on a semiconductor film, despite the fineness of the division, stripe patterns as observed in FIG. 1b are formed on the film.

The stripe patterns emerge to extend in a direction of the width of the linear beam. That is, FIG. 1b shows a silicon film that is produced by irradiating a laser beam having a longitudinal direction in the left and right direction of paper face by scanning the laser beam from bottom toward top of paper face. The stripe patterns shown by FIG. 1b orthogonal to the stripe patterns shown by FIG. 1a caused by way of overlapping linear laser beams, are shown on the film.

Incidentally, although stripes in the vertical direction are observed also in FIG. 1a, in this case, the photographing conditions are set such that horizontal stripes are easy to observe and therefore, the vertical stripes do not emerge so significantly as shown by FIG. 1b.

Further, when stripes in the vertical direction slightly observed in FIG. 1a are made easy to observe, vertical stripes as shown by FIG. 1b are observed. That is, nonuniformity of annealing (nonuniformity of crystallinity) represented by the vertical stripes in FIG. 1a and FIG. 1b are actually in the same state.

The stripe patterns in the vertical direction of FIG. 1a and FIG. 1b are formed in an innumerable number orthogonally to the longitudinal direction of the linear laser beam.

SUMMARY OF THE INVENTION

As factors of forming the vertical stripes as shown by FIG. 1b, the following two causes are conceivable.

(1) The original energy distribution of the rectangular beam is inherently provided with an energy distribution having a striped shape.

(2) The cause is derived from lens groups utilized in forming the linear laser beam.

The inventors carried out a simple experiment in order to ascertain which one of the above-described items constituted the cause. According to the experiment, an investigation was performed on how the above-described vertical stripes were changed by rotating a rectangular laser beam before the laser beam was incident on lens groups.

As a result, the vertical stripes remained unchanged. Therefore, it can be concluded that formation of the vertical stripes shown by FIG. 1b relates not to the original square beam but the lens groups.

In these lens groups, homogenizing is achieved by dividing and recombining a beam having a single wavelength and an aligned phase (phase of laser beam is aligned since laser achieves intensity by aligning phase) and accordingly, it can be explained that the stripes are interference fringes of light.

Interference of light is caused by a deviation in phases when fluxes of light each having an aligned phase and the same wavelength overlap each other with a difference in optical paths. In this case, stripe pattern is apparently observed by intensifying or weakening the fluxes of light at a certain period.

The following reasoning is conceived to study the above-describe d light interference. FIG. 3 shows behavior of interference fringes when fluxes of parallel light each having an aligned phase are made to pass through a mask where five slits 301 are opened at equal intervals.

The behavior of the interference fringes is shown by using an intensity I of light. When the five slits 301 are arranged at equal intervals, a peak of interference is caused at a region A in correspondence with the center of the slit group. Further, the interference fringes are formed centering on the peak.

This behavior is investigated by applying it to a cylindrical lens group 401 and a cylindrical lens 402 shown by FIG. 4. Incidentally, each of the cylindrical lenses is provided with a shape having a longitudinal length in the depth direction of the drawing.

Further, the number of divisions of beam caused by the cylindrical lens group 401 corresponds to the number of the slits 301 in FIG. 3.

In FIG. 4, the center A of the linear beam corresponds to the portion A at the center of the slit group of FIG. 3. That is, a peak of interference is formed at the portion A in FIG. 4.

In FIGS. 3 and 4, intensified and weakened portions of interference are periodically formed centering on the point A and the distribution reaches points B and C of the drawings.

Although such a clear intensity distribution is not shown in interference fringes formed by actual laser, the reason is that wavelengths of fluxes of laser beam are not completely aligned. Also, there is provided an influence caused by transmitting light through the lenses.

The inventors prepared an optical system shown by FIG. 5 in order to erase such interference fringes. The difference of this optical system from the optical system of FIG. 4 resides in that laser beam divided by a cylindrical lens group 501 on the incident side of beam, is fabricated into a parallel ray by a succeeding cylindrical lens 502.

Such an optical system can simply be provided by suitably selecting a distance between the preceding cylindrical lens group 401 and the succeeding cylindrical lens 402 in FIG. 4.

Such a structure was conceived to restrain occurrence of interference fringes by disposing peaks of light interference at any portions of the beam.

However, even when the beam actually fabricated by this optical system was used, the vertical stripes shown by FIG. 1b were invariably formed. That is, stripes extending in the width direction of the linear beam were observed.

However, by adopting the optical system shown by FIG. 5, the intensity of stripe (may be referred to distribution of intensity) is alleviated although the amount of alleviation is small.

It is proper to interpret that the stripe is caused when way of interference is varied delicately at respective points of the beam owing to the thicknesses of the lenses.

It is impossible to dispense with the thicknesses of the lenses and therefore, it is impossible to completely dispense with the light interference in the beam.

The system of irradiating the linear laser beam is provided with a constitution shown by, for example, FIGS. 2a and 2b. According to the constitution, a cylindrical lens group 203 for dividing the beam in the longitudinal direction of the linear beam and a cylindrical lens group 202 for dividing the beam in a direction orthogonal thereto are arranged.

Incidentally, in FIGS. 2a and 2b, a combination of the cylindrical lens group 202 and a cylindrical lens 204 and a combination of the cylindrical lens group 203 and a cylindrical lens 205 provide quite a similar operation to the laser beam.

Accordingly, it is concluded that light interference as shown by FIG. 3 is caused also in the beam width direction in the linear laser beam.

It is concluded from the above-described survey that when the optical system as shown by FIGS. 2a and 2b is adopted, as shown by FIG. 6, peaks of interference 602 (represented by circle marks) are distributed in a lattice form in the linear laser beam 601.

Generally, the width of the linear laser beam is equal to or smaller than 1 mm and points of interference in the width direction are not observed. On the other hand, in respect of the longitudinal direction, the length of the laser beam is extended over a length of 10 cm or more and therefore, points of interference in the longitudinal direction are observed. These are observed as the vertical stripes shown by FIG. 1b.

When the single one of the linear laser beam per se is observed, the interference shown by FIG. 6 is present.

On the other hand, according to the actual laser annealing operation, the linear laser beam is irradiated to overlap successively little by little. Therefore, by scanning the laser beam, the above-described interference present in a single body of the linear laser beam also overlaps.

This seems to expedite further the nonuniformity of laser annealing caused by the interference.

That is, as shown by FIG. 7, the periodic intensity distribution of energy caused by light interference is observed in the longitudinal direction of the linear laser beam 701. (As has been described, the periodic intensity distribution of energy caused by light interference is observed also in the width direction of the linea laser beam, however, the distribution does not effect a significant influence on the present invention.)

When these irradiations overlap each other as shown by FIG. 7, the stripes are emphasized.

It is an object of the present invention disclosed in the specification to provide a technology for correcting striped nonuniformity of processing distributed in the longitudinal direction of a linear beam that is caused when the linear laser beam is irradiated while scanning the beam.

According to the present invention disclosed in the specification, when a linear laser beam having a number of interference points as shown by FIG. 6 is irradiated while scanning the beam, the influence of interference is restrained from manifesting in the irradiation effect by preventing the interference points from overlapping each other.

For example, the direction of scanning a linear laser beam of a pulse oscillation type is changed to a direction slightly oblique in respect of the conventional direction.

In this case, the irradiated position is shifted delicately at respective pulses and portions of contiguous pulses overlap each other. In this way, the interference points do not overlap each other completely and are brought into a dispersed state although the interference points partially overlap.

Further, the nonuniformity of the irradiation effect caused by interference is corrected. Specifically, formation of the stripe patterns shown by FIG. 1*b* is corrected.

According to one aspect of the present invention disclosed in the specification, there is provided a laser irradiating device comprising laser beam generating means for forming a laser beam by dividing and recombining the laser beam, means for irradiating the laser beam by scanning the laser beam in a direction having a predetermined angle $\theta$ ($\theta \neq 0°$) in respect of a direction orthogonal to a direction of dividing the laser beam, wherein the laser beam is of a pulse oscillation type, and wherein pulses of the laser beam are irradiated by overlapping portions of the pulses at an irradiated region.

Further, the above-described constitution is featured in that an intensity distribution periodically varied in the direction of dividing the laser beam is present in the laser beam and the distribution is caused by the laser beam generating means.

Peaks of interference caused by an optical system can be prevented from overlapping each other by the above-described constitution.

According to another aspect of the present invention, there is provided a laser irradiating device comprising means for irradiating a linear laser beam, means for irradiating the laser beam by scanning the laser beam in a direction having a predetermined angle $\theta$ ($\theta \neq 0°$) in respect of a direction of a width of the linear laser beam, wherein the laser beam is provided with an intensity distribution periodically varied in a longitudinal direction of the laser beam;

wherein the laser beam is of a pulse oscillation type, and wherein pulses of the laser beam are irradiated by overlapping portions of the pulses at an irradiated region.

According to another aspect of the present invention, there is provided a laser irradiating device comprising means for irradiating a linear laser beam, means for irradiating the laser beam by scanning the laser beam in a direction having a predetermined angle $\theta$ ($\theta \neq 0°$) in respect of a direction of a width of the linear laser beam, wherein the laser beam is provided with an intensity distribution periodically varied in a longitudinal direction of the laser beam, wherein the laser beam is of a pulse oscillation type, wherein pulses of the laser beam are irradiated by overlapping portions of the pulses at an irradiated region, and wherein the angel $\theta$ is selected from a range where peaks of the periodic intensity distribution do not overlap.

The above-described constitution is featured in that the angle $\theta$ is selected from a range satisfying $0.01 \leq |\tan \theta| \leq 0.3$.

According to another aspect of the present invention, there is provided a laser irradiating method which is a method of irradiating a linear laser beam of a pulse oscillation type having an intensity distribution periodically varied in a longitudinal direction of the laser beam, the method comprising the steps of, scanning the laser beam in a direction having a predetermined angle $\theta$ ($\theta \neq 0°$) in respect of a direction of a width of the linear laser beam, and irradiating pulses of the laser beam by overlapping portions of the pulses at an irradiated region.

Further, the above-described constitution is featured in that the angle $\theta$ is selected from a range where peaks of the periodic intensity distribution do not overlap each other.

Further, the above-described constitution is featured in that $\theta$ is selected from a range satisfying $0.01 \leq |\tan \theta| \leq 0.3$.

Further, the effect of the present invention is not achieved when the linear laser beam do not overlap at the irradiated face.

In this case, even when the beams do not overlap, only the presence of the interference points is revealed and therefore, even when the laser beam is scanned, the interference points are only extended in the scanning direction.

In irradiating the linear laser beam, by scanning the beam in the direction having a predetermined angle in respect of the direction orthogonal to the longitudinal direction of the beam, the periodic iteration of the intensity of the irradiation energy density that is observed in the longitudinal direction of the linear laser beam can be prevented from overlapping each other completely and interference fringes can be prevented from emerging.

That is, by changing the scanning direction of the linear laser beam, the iteration of the maximum portion or the minimum portion of energy in the beam is prevented from completely disposing at the same portion of the semiconductor film. (That is, irradiation is performed by shifting the beam little by little.)

In this way, the energy distribution in the linear laser beam is dispersed in the semiconductor film and the laser annealing can be performed more uniformly.

BRIEF DESCRIPTION OF THE DRAWINGS

FIG. 14 is a diagram showing a state of overlapping laser beam when a linear laser beam is irradiated by 20 pulses by scanning the beam in an oblique direction.

DETAILED DESCRIPTION OF THE PREFERRED EMBODIMENT

In executing the present invention, a linear laser beam is irradiated by scanning the beam in a direction slightly oblique in respect of the width direction.

For example, the case where laser annealing is performed under the following conditions will be explained.

The length in the longitudinal direction of the linear laser beam is 135 mm and the width is 0.4 mm.

An interval between peaks of interference (interval between fringes) is about 0.1 mm.

Oscillation frequency is 29 Hz.

Scanning speed is 1.2 mm/sec.

Figure 11:
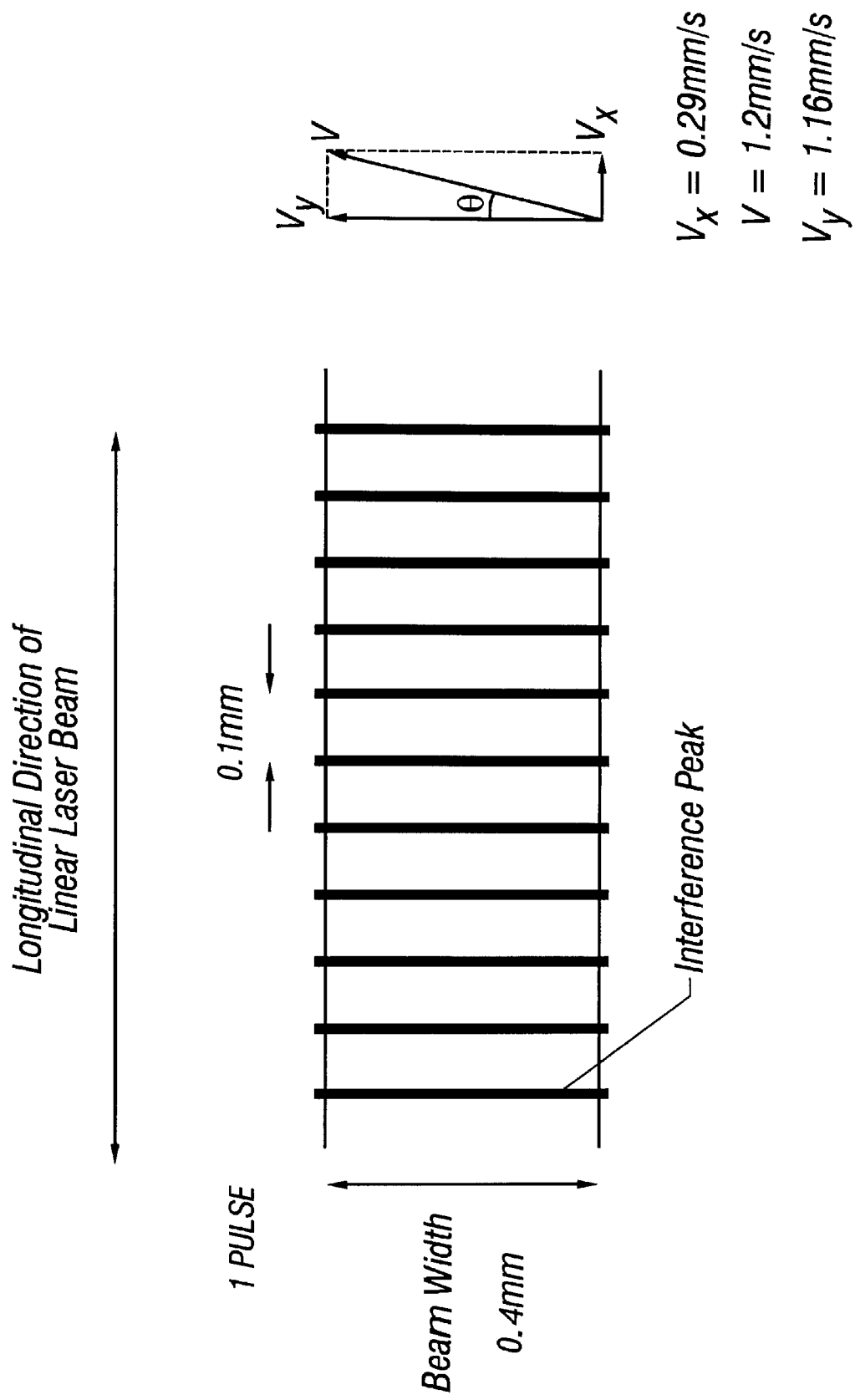
FIG. 11 is a diagram showing a state of a section of a linear laser beam.

FIG. 11 schematically shows the section of one laser pulse. The laser beam is scanned in a direction having an angle θ in respect of a direction of a linear width (beam width direction). θ has a value satisfying tan θ=0.25.

In order to realize the above-described scanning method, the scanning direction may be set such that in scanning a substrate by 100 mm, the linear laser beam is shifted transversely by about 25 mm.

In order to realize scanning of laser beam as shown by FIG. 11, a laser optical system is fixed, a sample is mounted on an x-y stage, the sample mounted on the x-y stage is moved at a speed of 0.29 mm/s in x direction and a speed of 1.16 mm/s in y direction and the movement is produced by synthesizing the vectors.

When the irradiation is performed under the above-described conditioning, the sample is moved by 1.16 mm/29=0.04 mm until a next pulse is irradiated. That is, the interval between contiguous pulses is 0.04 mm.

Figure 12:
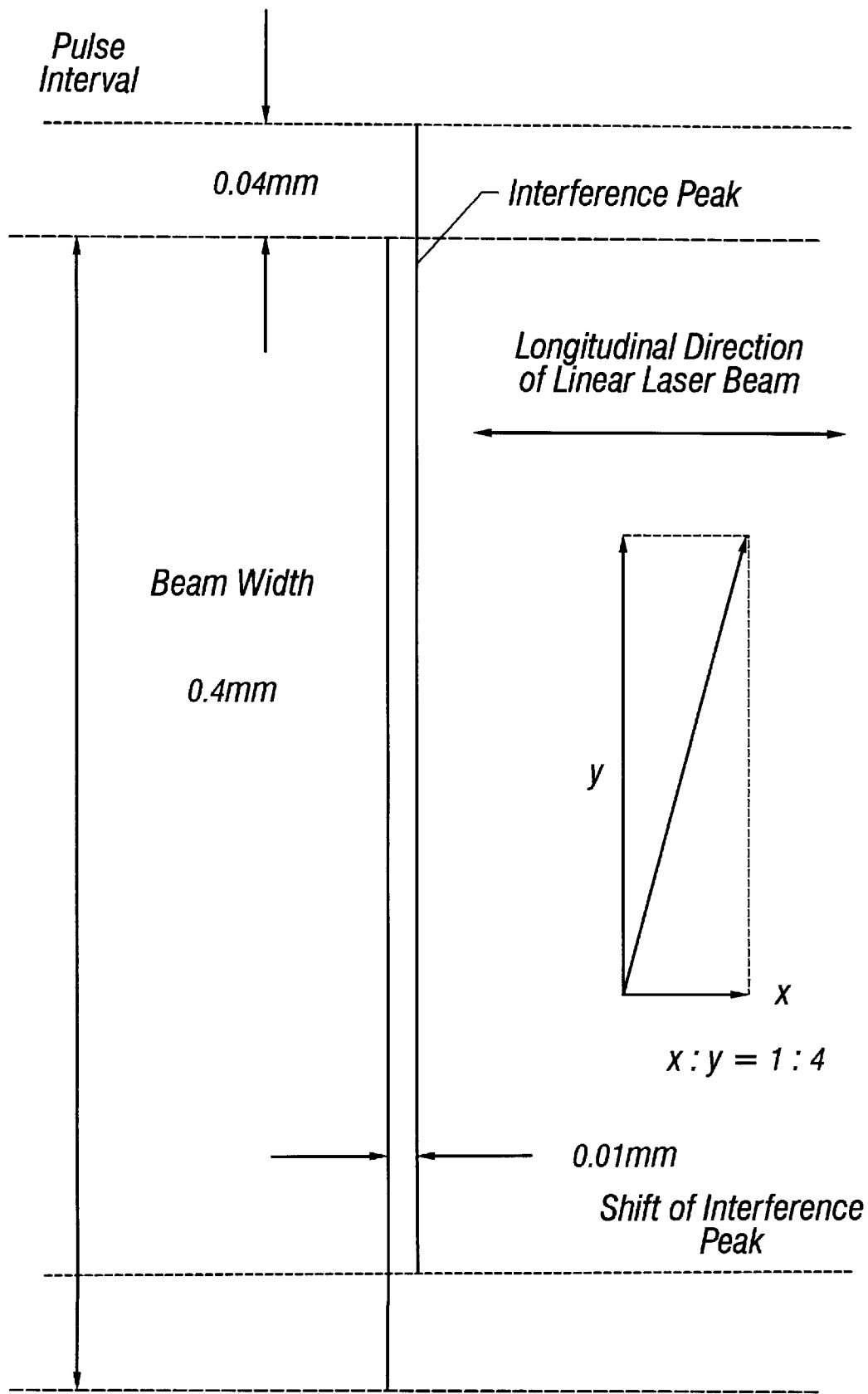
FIG. 12 is a diagram showing a state of overlapping laser beam when a linear laser beam is irradiated by scanning the beam in an oblique direction.

When such an irradiation method is adopted, as shown by FIG. 12, in the contiguous pulses, a peak of interference is shifted by 0.01 mm (parallel movement).

The reason is that the contiguous laser pulses are apart from each other by (1.16/29) mm=0.04 mm in y direction and at the same time, apart from each other by (0.29/29) mm=0.01 mm in x direction.

In this case, the contiguous linear laser pulses are brought into a state where they overlap each other by 90% in the width direction. That is, a portion of 0.36 mm in the beam width of 0.4 mm is brought into an overlapped state.

However, in the contiguous linear laser pulses, the position of the peak of interference is delicately shifted. That is, as shown by FIG. 12, the peak of interference is shifted by 0.01 mm.

Figure 13:
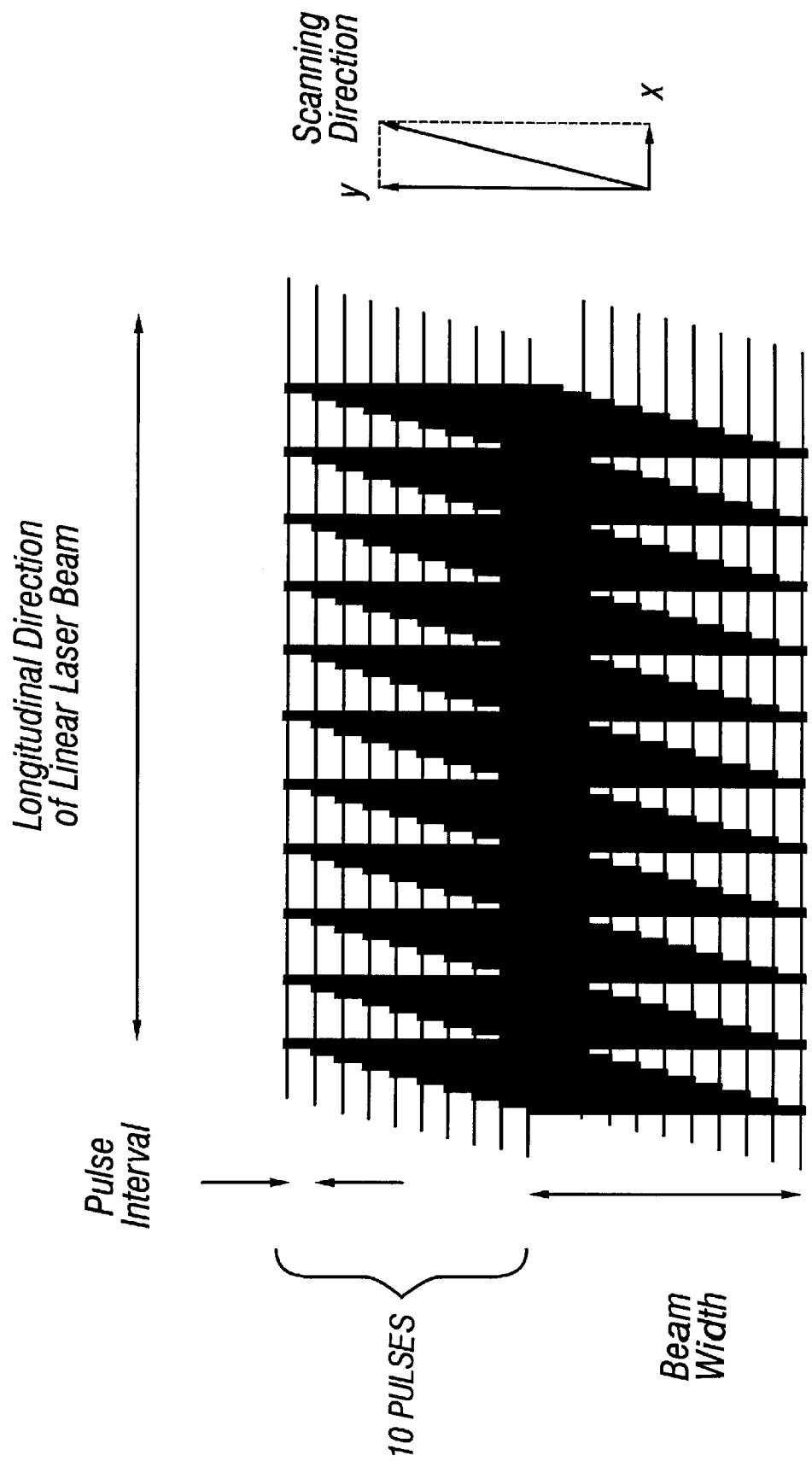
FIG. 13 is a diagram showing a state of overlapping laser beam when a linear laser beam is irradiated by 10 pulses by scanning the beam in an oblique direction.

FIG. 13 shows a state where 10 pulses are irradiated by such an irradiation method. FIG. 13 shows a state where the laser beam is scanned by 0.04 mm×10=0.4 mm.

In this case, the peak of interference in an irradiated region of 1-st pulse and the peak of interference in an irradiated region of 11-th pulse are exactly aligned in the width direction of the beam.

FIG. 14 shows a state of a distribution of the peaks of interference when 20 pulses are further irradiated. FIG. 14 shows a state where the laser beam is scanned by 0.04 mm×20=0.8 mm.

As shown by FIG. 14, by pertinently setting a combination of;

width of linear laser beam, interval between peaks of interference, scanning direction, scanning speed, beam width, and oscillation frequency, the peaks of interference present in the beam can be prevented from overlapping each other in the irradiated region as shown by FIG. 14.

In this way, nonuniformity in irradiation and nonuniformity in annealing in the irradiated region can be corrected.

Figures 1A, 1B:
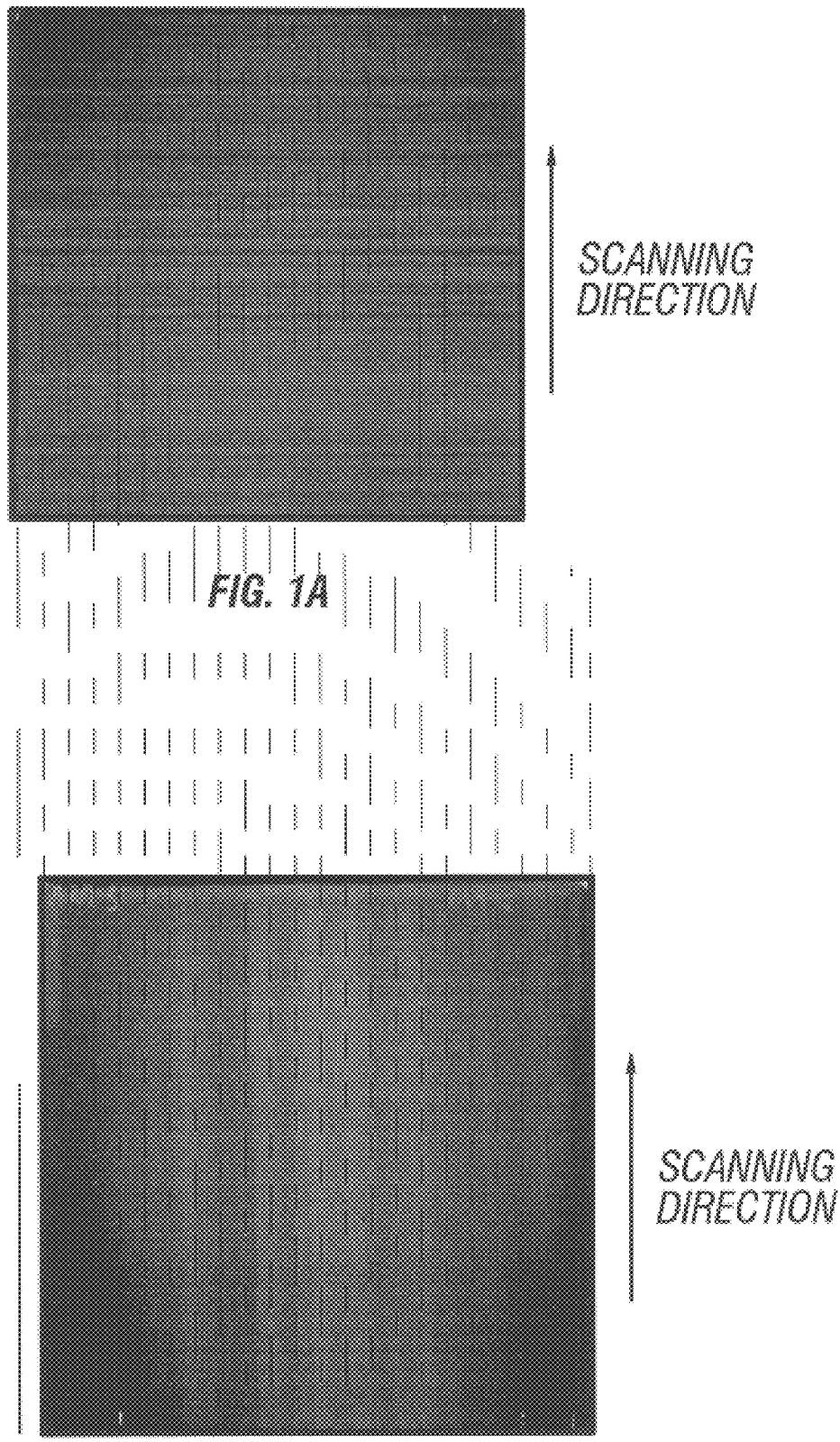
FIGS. 1*a* and 1*b* are photographs of a surface of a silicon film crystallized by laser crystallization using a linear laser.

Accordingly, the occurrence of irradiation patterns caused by overlapping of the peaks of interference as shown by FIG. 1b can be restrained.

Actually, there are various parameters of a deviation in adjustment of an optical system, a difference in setting design parameters, a difference in oscillation intensity of laser, a difference in sample and the like, and therefore, the dispersion of the peaks of interference is not necessarily be carried out according to the theory as has been described.

In the actual practice, the value of θ is set such that the peaks do not overlap in reference to intervals of particularly conspicuous peaks or an average value thereof and laser is irradiated actually at a vicinity of the set angle θ to thereby set an angle for making the stripes most inconspicuous.

As is apparent from the above-described explanation, the present invention disclosed in the specification is effective when laser beam is irradiated by scanning the laser beam while overlapping partially pulses thereof. The more the pulses overlap the more promoted is the effectiveness.

When the present invention disclosed in the specification is used, the effect is achieved even with an angle by which the beam is shifted by 1 mm transversely in scanning a substrate by 100 mm. The reason is that the peaks of interference can be prevented from being disposed at certain points on a substrate only by slightly skewing the scanning direction.

(Embodiment 1)

A case where a crystalline silicon film is provided by laser annealing will be shown in fabrication steps of the following embodiment. First, a method of fabricating three kinds of films which are objects for annealing operation. The present invention disclosed in the specification is effective in respect of either of the films.

First, either of the three kinds of films is formed on a glass substrate of Corning 1737 of 127 mm square as the substrate.

First, a silicon oxide film as an underlayer film is formed on the glass substrate by a thickness of 2000 Å by a plasma CVD (Chemical Vapor Deposition) process. Next, an amorphous silicon film is formed on the underlayer film by a thickness of 500 Å using a plasma CVD process. The amorphous silicon film is referred to as starting film.

(Fabrication Procedure of Film A)

First, a heating treatment at 450° C. for 1 hour is carried out in respect of the starting film. This step is a step for reducing the concentration of hydrogen in the amorphous silicon film. This step is needed since when hydrogen in the film is excessive, hydrogen is blown out from the film in irradiating laser beam and the surface of the film is roughened.

It is appropriate to make density of hydrogen in the film after the step at an order of $10^{20}$ atoms/cm$^3$. This film is referred to as non single crystal silicon film A.

(Fabrication Procedure of Film B)

First, a starting film is formed. An extremely thin oxide film is formed thereon. The oxide film is formed by irradiating an UV (Ultra Violet) ray in an oxygen atmosphere.

Next, an aqueous solution of nickel acetate including nickel element is coated by a spin coating process at a concentration (in term of weight) of 10 ppm. In this case, the former oxide film functions to improve the wettability of the solution.

In this state, nickel is uniformly brought into contact with and held on the starting film (amorphous silicon film).

Next, a heating treatment is carried out at 600° C. for 4 hours. In this step, the amorphous silicon film is crystallized. The crystallization is carried out by operation of nickel element. (Generally, when a heating treatment at 600° C. for 4 hours is carried out in respect of an amorphous silicon film, the film is not crystallized.)

In this way, the non single crystal silicon film B which has been crystallized by the operation of nickel is obtained.

Incidentally, with regard to the function of nickel, details are described in Unexamined Published Japanese Patent Application No. 6-244104.

(Fabrication Procedure of Film C)

A silicon oxide film is further formed on a starting film by a thickness of 700 Å. A plasma CVD process is used as the film forming method.

Next, a portion of the silicon oxide film is removed by a photolithography patterning step by which an opening is formed. The opening is provided with a linear shape (slit shape).

Next, an UV beam is irradiated for 5 minutes in an oxygen atmosphere in order to form a thin oxide film at the opening. The thin oxide film is formed to improve the wettability of the opening in respect of a nickel aqueous solution to be introduced in later steps.

Next, an aqueous solution of nickel acetate of 100 ppm is coated by a spin coating process. Under this state, nickel acetate is incorporated in the opening portion. Further, at the opening, nickel element is brought into contact with and held on the surface of the amorphous silicon film (on the surface of which the UV-oxidized film has been formed) exposed at the opening portion.

Next, thermal annealing is performed at 600° C. for 8 hours. In this step, crystals grow from a portion of introducing nickel in the transverse direction (direction in parallel with substrate/direction in parallel with film surface).

In this case, the function achieved by nickel is the same as that of film B. Under the above-described conditions, about 40 μm of transverse growth amount is provided.

The growth amount is varied in accordance with film quality of starting film, film thickness, condition of coating nickel acetate aqueous solution or the like, annealing condition or the like.

When the crystallization has been finished, the silicon oxide film on the crystalline silicon film is exfoliated to remove by using buffer hydrogen fluoride.

In this way, the amorphous silicon film is crystallized and the crystallized non single crystal silicon film C is obtained.

Laser annealing is performed in respect of the non single crystal silicon films A, B and C provided in this way. In this case, laser annealing is performed for crystallization with respect to the sample A. Further, laser annealing is performed to further improve the crystallinity of the crystallized silicon film with respect to the sample B and the sample C.

U.S. Pat. Nos. 5,585,291 and 5,534,716 disclosed a semiconductor devices, each having a thin film transistor comprising a crystalline semiconductor film, the disclosures of which are incorporated herein by references. The crystallized films of the present invention can be used in such thin film transistors and semiconductor devices.

Figure 9:
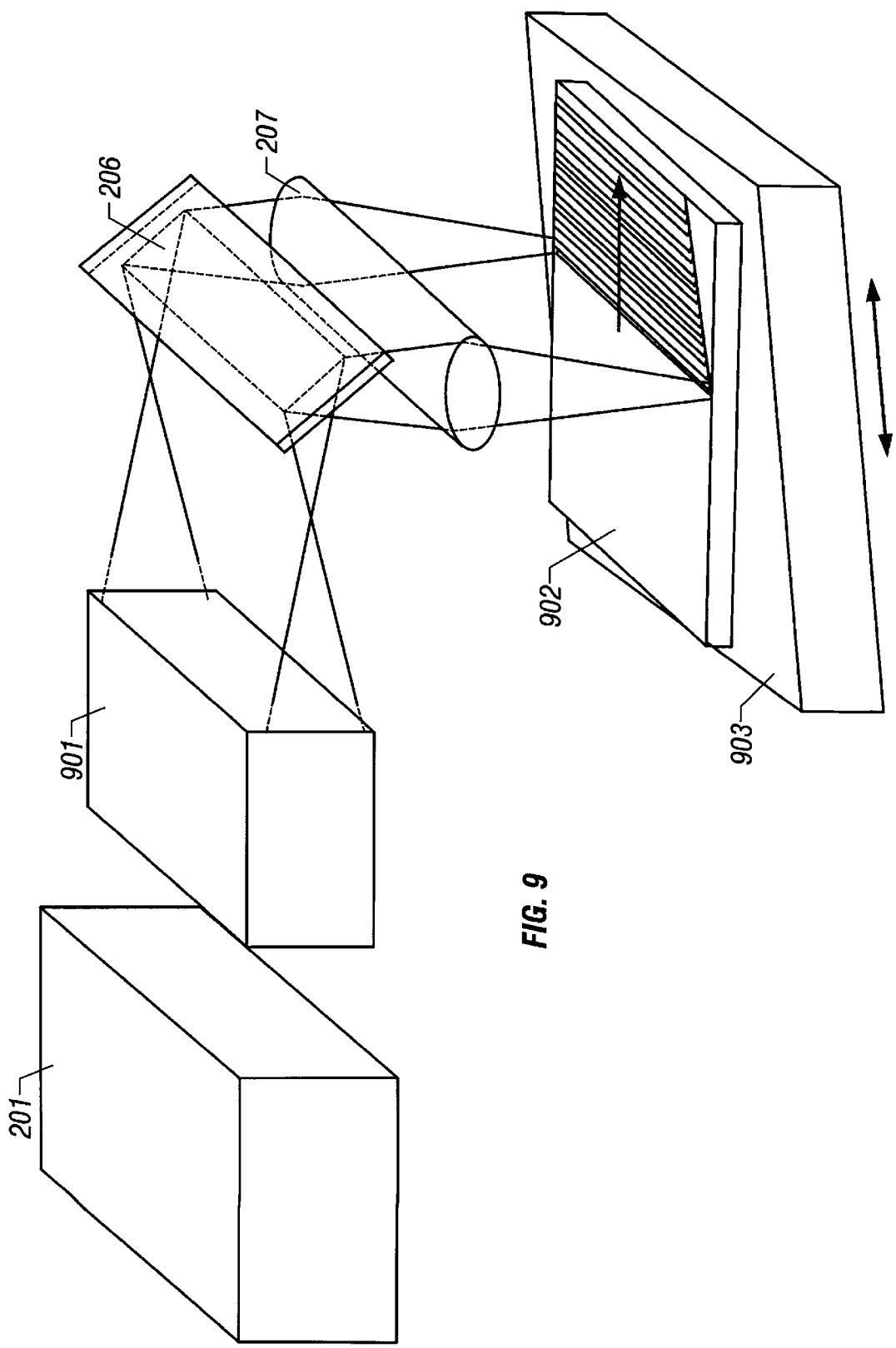
FIG. 9 is a view showing a laser irradiation system according to an embodiment.

FIG. 9 shows an outline of a laser irradiation system according to an embodiment.

According to the laser irradiation system shown by FIG. 9, laser is output from a laser oscillation device 201 and the section is fabricated in a linear shape by an optical system 901.

Pulse laser beam which has been fabricated by the optical system, is reflected by the mirror 206 and is irradiated to a processed substrate 902 while being condensed by the cylindrical lens 207.

Figure 2A:
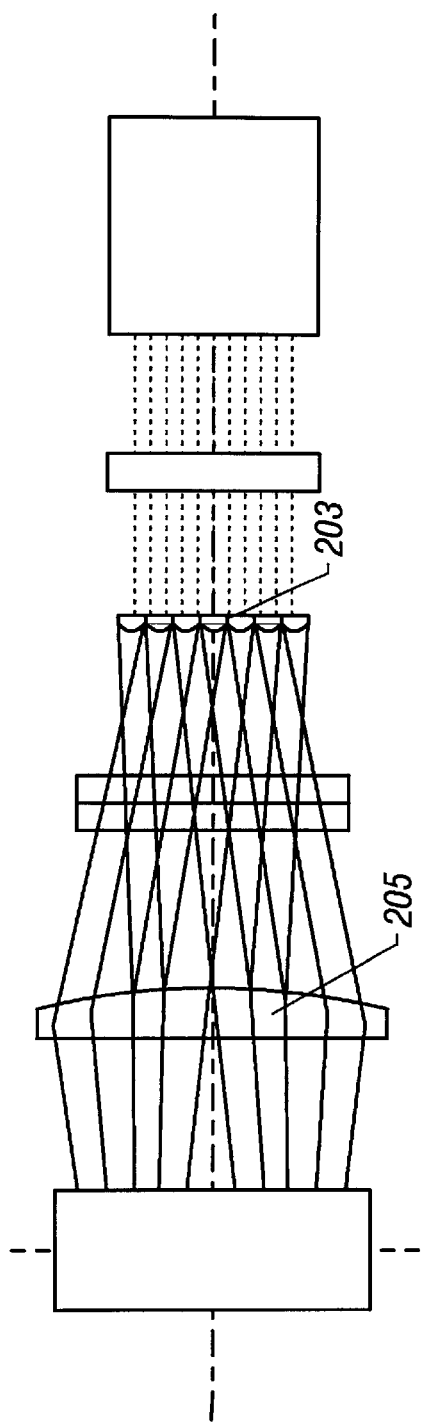
FIGS. 2*a* and 2*b* show an optical system for forming a laser beam according to an embodiment.
Figure 2B:
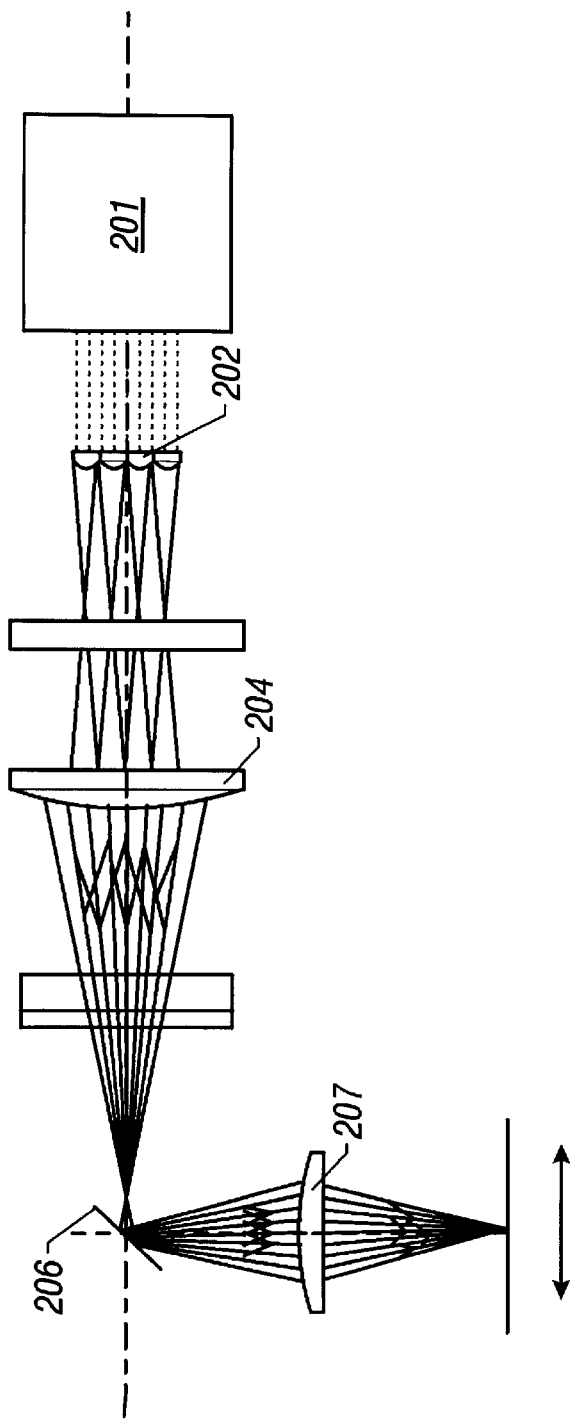
Figure 3:
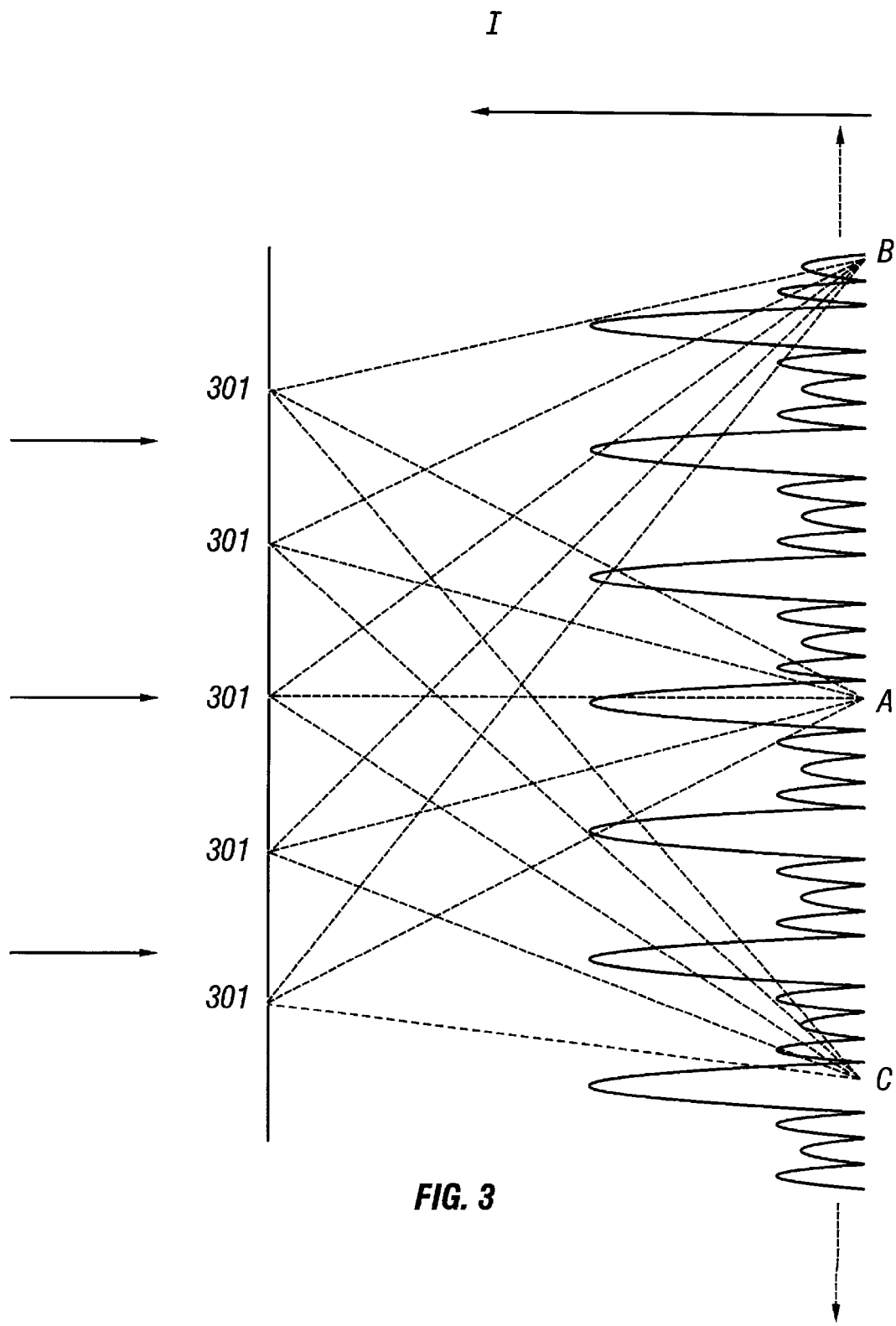
FIG. 3 is an illustration of light interference by a number of fluxes.

The optical system 901 is constituted by the cylindrical lens groups 202 and 203 and the cylindrical lenses 204 and 205 shown by FIGS. 2a and 2b. Further, the mirror 206 and the cylindrical lens 207 are shown in FIGS. 2a and 2b.

The optical system shown by FIGS. 2a and 2b is used since the beam shape can be fabricated into a linear shape while averaging nonuniformity of energy of the beam before the beam is incident on the optical system by overlapping divided fluxes. The dispersion of the energy distribution in the linear beam face is within about ±5%.

The role of the lens groups of types shown by FIGS. 2a and 2b will be described as follows.

The cylindrical lens groups 202 and 203 serve to divide the beam into fluxes in the vertical direction and in the horizontal direction. The divided fluxes are converged by the cylindrical lenses 204 and 205 and further, the fluxes are irradiated to an irradiated region as a linear laser beam via the cylindrical lens 207.

According to the embodiment, the cylindrical lens group 202 is constituted by seven cylindrical lenses. Further, the cylindrical lens group 203 is constituted by five cylindrical lenses.

Accordingly, the original laser beam is divided into five fluxes in the horizontal direction and seven fluxes in the vertical direction. According to this state, the original laser beam is divided into 35 divisions. Further, 35 divisions of the laser beam are made to overlap and the energy distribution in the beam is averaged.

A ratio of the length and the breath of the beam can freely be changed in view of the structures of the lens groups and therefore, every kind of beam from a square shape one to a linear shape one can be formed by the optical system. However, a beam shape that is easy to form is limited by a combination of the sizes of lenses and the focal distances.

Figure 4:
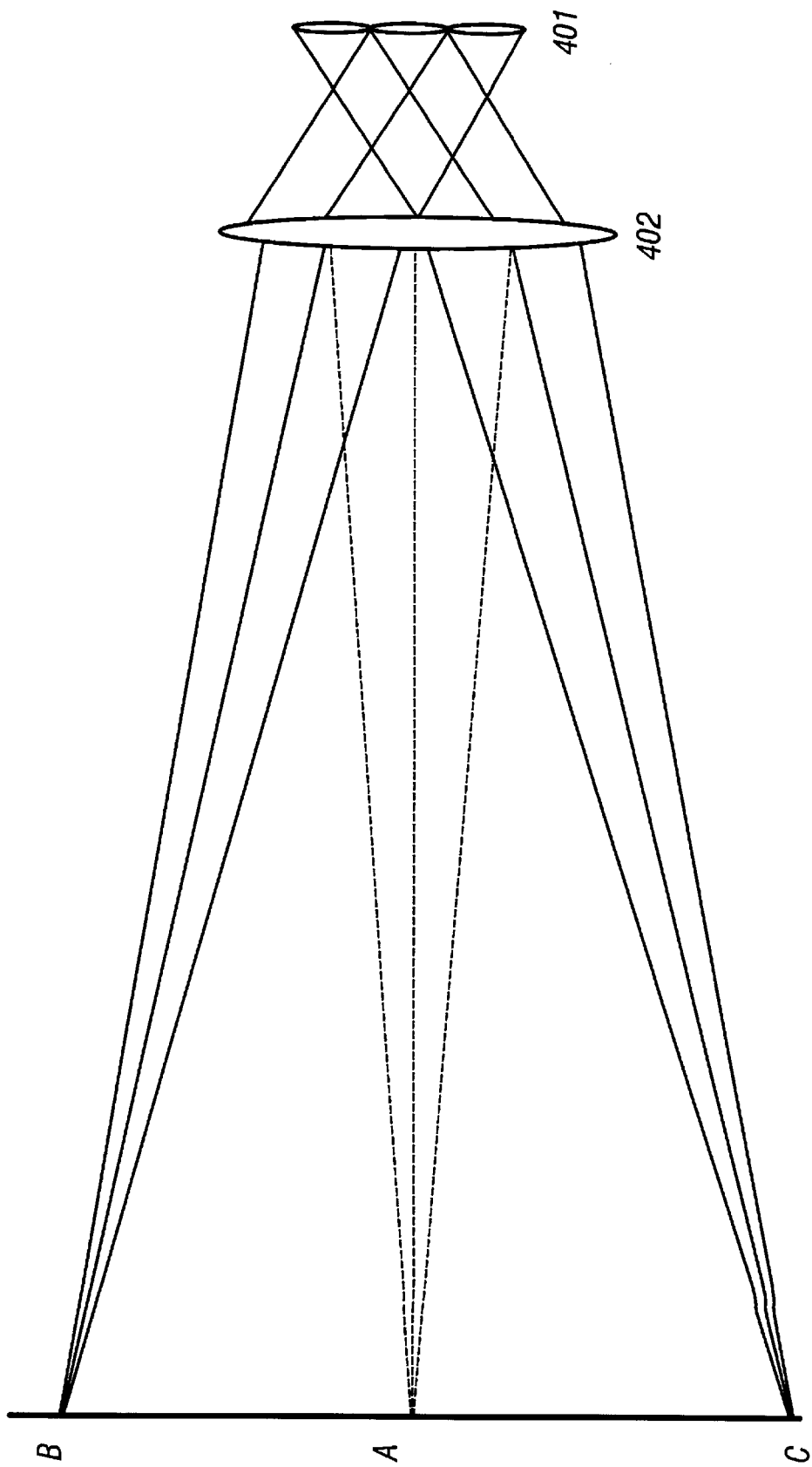
FIG. 4 illustrates optical paths when a beam is divided and recombined by an optical system for forming a linear laser.

Specifically, when the lens groups are arranged by the arrangement shown by FIG. 4, the length of one side of the rectangular beam can be changed by changing the distance between the cylindrical lens group 401 and the cylindrical lens 402.

Figure 5:
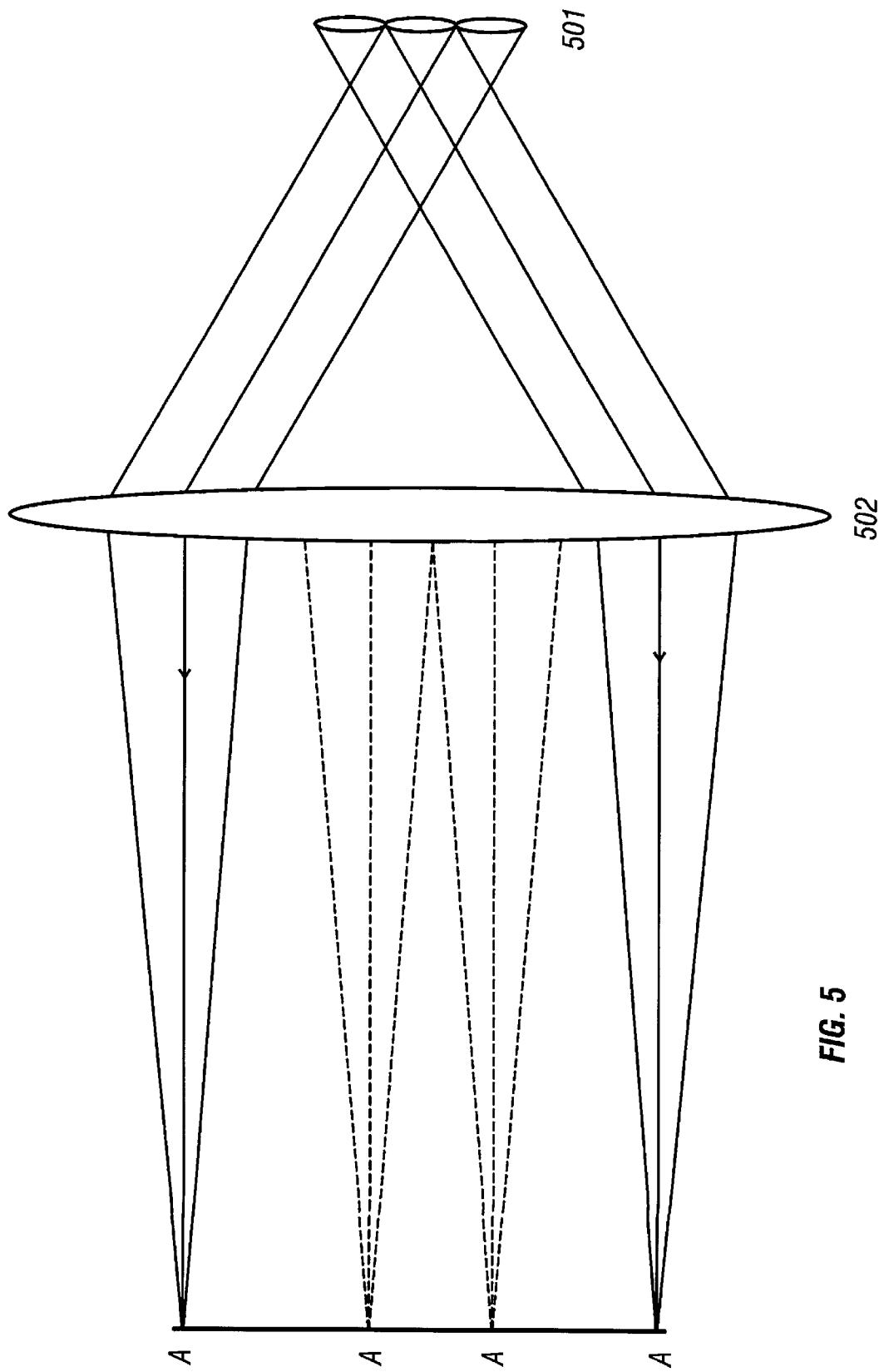
FIG. 5 illustrates optical paths when a beam is divided and recombined by an optical system for forming a linear laser.
Figure 6:
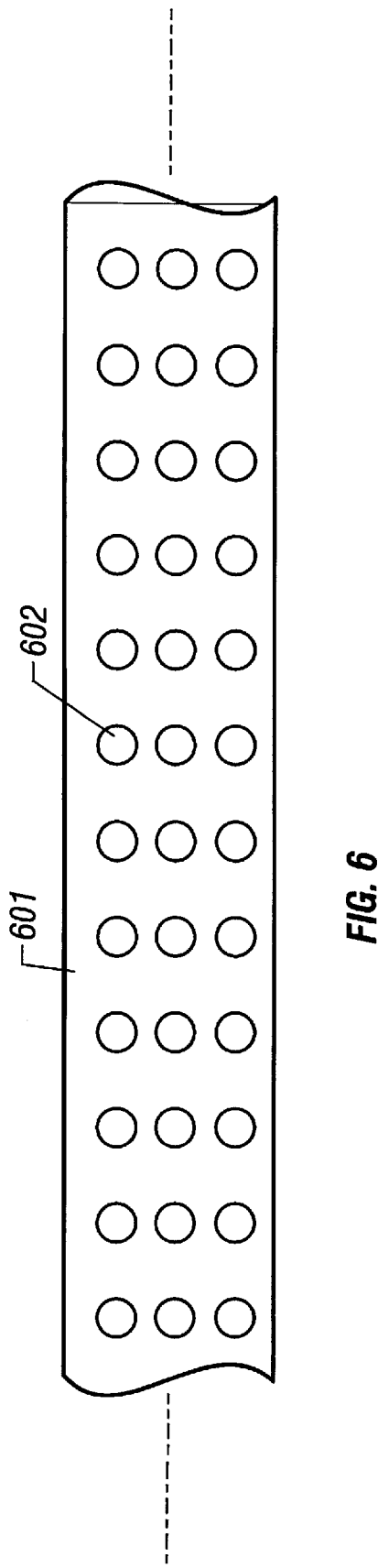
FIG. 6 is a diagram showing laser irradiation according to an embodiment.
Figure 7:
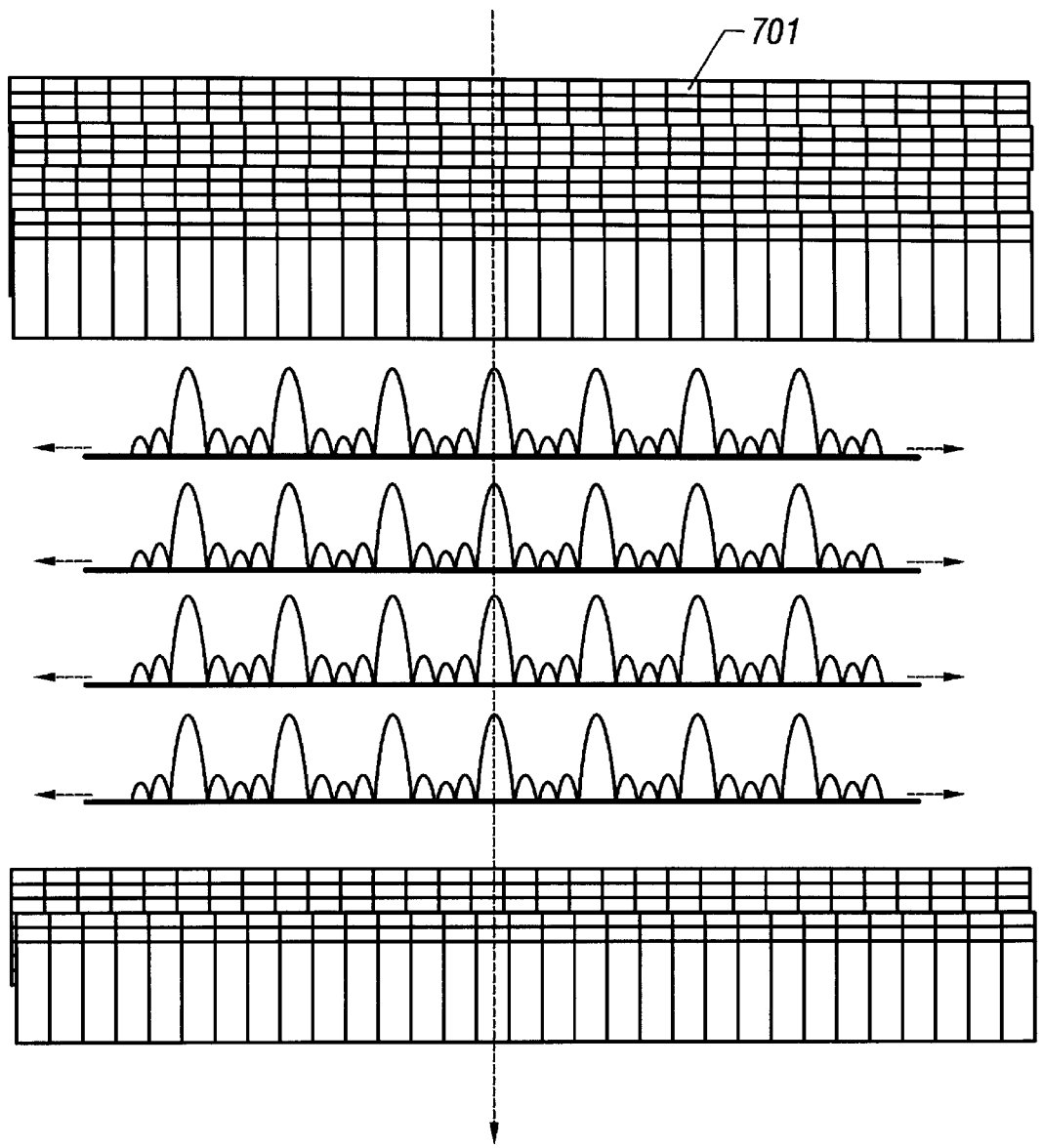
FIG. 7 is a diagram showing behavior of laser irradiation emphasizing light interference.
Figure 8:
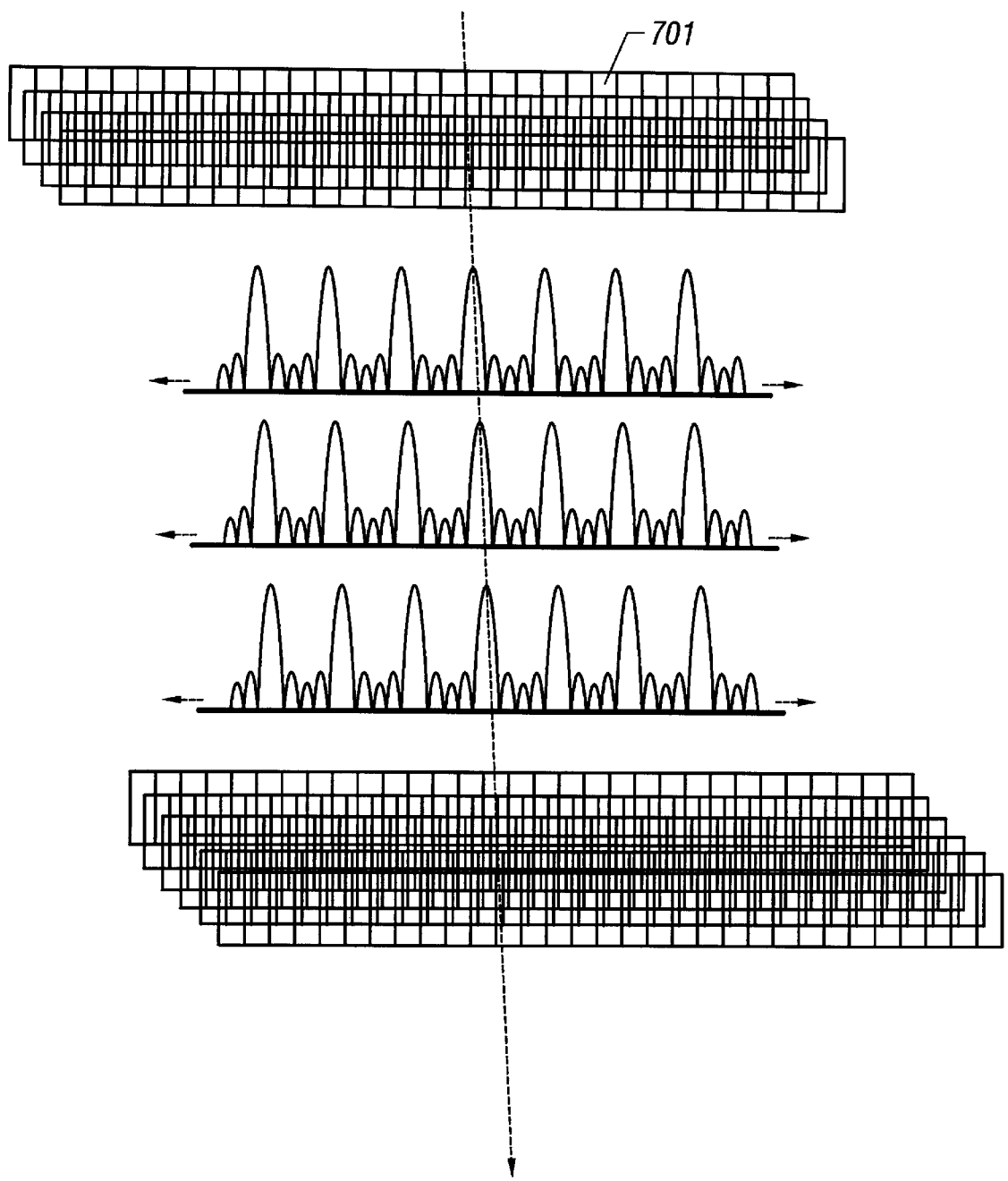
FIG. 8 is a diagram showing behavior of laser irradiation for making light interference inconspicuous.

However, when laser beam having an optical path shown by FIG. 5 is intended to form, the distance between the cylindrical lens group 501 and the cylindrical lens 502 is prescribed by the focal lengths of both and therefore, the length of one side of the rectangular beam is also fixed.

Therefore, in order to form the laser beam having the optical path shown by FIG. 5, the lens group must be designed after determining previously a desired beam size.

The embodiment is effective by using any of arrangements of the lens groups described in FIG. 4 and FIG. 5.

Incidentally, the cylindrical lens groups 202 and 203 are constituted by convex lens groups, however, concave lens groups or groups of a mixture of concave and convex lenses can be used.

In this embodiment, the laser oscillation device 201 oscillates XeCl excimer laser (wavelength 308 nm). Otherwise, KrF excimer laser (wavelength 248 nm) or the like may be used.

Figure 10:
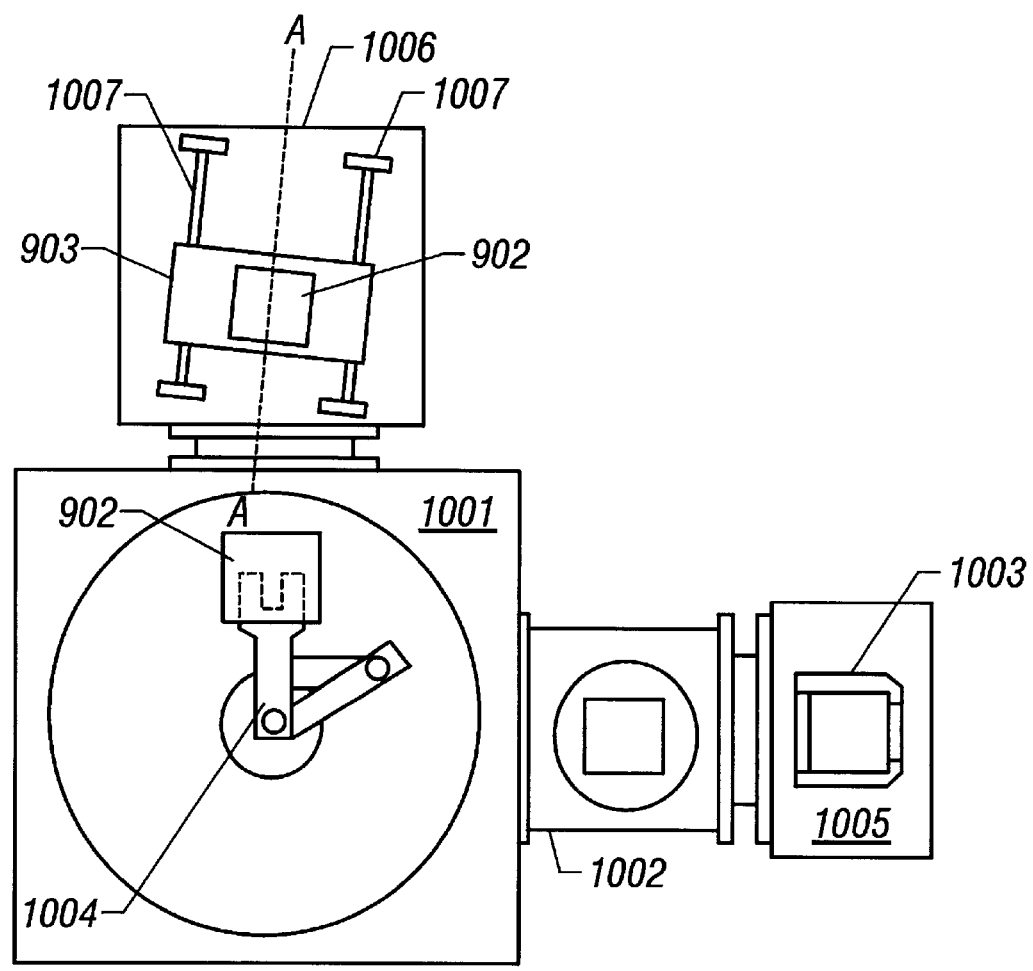
FIG. 10 is a top view showing a laser annealing device according to an embodiment.

FIG. 10 shows an outline of a total of laser annealing device.

In performing laser annealing, the processed substrate 902 is arranged on the base 903. (refer to FIG. 9)

Further, the base 903 is moved straight in an angular direction (on a face including a plane including the linear laser beam) which is slightly deviated from a direction orthogonal to the line direction of the linear laser beam by a moving mechanism 1007 and laser beam is irradiated to an upper face of the processed substrate 902 while being scanned. Further, the structure can finely adjust the angle.

An explanation will be given of the device shown by FIG. 10. Numeral 1005 designates a load/unload chamber. A large number of sheets of the processed substrates 902, for example, 20 sheets thereof are incorporated in the load/unload chamber 1005 in a state encapsulated in a cassette 1003.

In the operation, one sheet of the substrates is moved from the cassette 1003 to an alignment chamber 1002 by a robot arm 1004.

An alignment mechanism is arranged in the alignment chamber 1002 for modifying the positional relationship between the processed substrate 902 and the robot arm 1004. The alignment chamber 1002 is connected to the load/unload chamber 1005.

The substrate is transferred to a substrate transfer chamber 1001 by the robot arm 1004 and is transferred to a laser irradiation chamber 1006 by the robot arm 1004.

In FIG. 9, dimensions of the linear laser beam irradiated onto the processed substrate 902 are width 0.4 mm×length 135 mm. The beam is formed by the lens arrangement shown by FIG. 4.

The dimensions of the laser beam can be enlarged further by design of the lens system.

The energy density of laser beam on the irradiated face is selected from a range of 100 mJ/cm$^2$ through 500 mJ/cm$^2$. In this embodiment, the energy density is set to 300 mJ/cm$^2$.

The irradiation conditions are as follows.

The length of the linear laser beam in the longitudinal direction is 135 mm and the width is 0.4 mm.

The interval between peaks of interference (interval of fringes) is about 0.1 mm.

Oscillation frequency is 29 Hz.

Scanning speed is 1.2 mm/sec.

In this case, when attention is paid to one point of the irradiated region, as shown by FIG. 13, 10 shots of laser beam are irradiated. It is appropriate to select the number of shots from a range of 5 shots through 50 shots.

After fishing to irradiate laser, the processed substrate 902 is retracted to the substrate transfer chamber 1002 by the robot arm 1004.

The processed substrate 902 is transferred to the load/unload chamber 1005 and is incorporated in the cassette 1003 by the robot arm 1004.

In this way, the laser annealing steps are finished. Thereby, by repeating the steps, a large number of substrates can be processed continuously one by one.

Although the linear laser is used in the embodiment, an effect which the present invention features, is achieved even when any beam shape from a linear shape to a square shape is used in the present invention.

By utilizing the present invention disclosed in the present invention, the in-face homogeneity which is an effect of laser annealing by a laser beam produced by homogenizing laser beam by division and recombination, can significantly be promoted.

While the invention has been described in detail and with reference to specific embodiments thereof, it will be apparent to one skilled in the art that various changes and modifications can be made therein without departing from the spirit and scope thereof.

What is claimed is:

1. A laser irradiating device comprising:

laser beam generating means for forming a laser beam by dividing and recombining the laser beam in both width and longitudinal directions of the laser beam cross section;

means for irradiating the laser beam by scanning the laser beam in a direction having a predetermined angle (θ.) in respect of said width direction of the laser beam cross section;

wherein the laser beam is of a pulse oscillation type; and wherein pulses of the laser beam are irradiated by overlapping portions of the pulses at an irradiated region.

2. The leaser irradiating device according to claim 1, wherein an intensity distribution periodically varied in the longitudinal direction of the laser beam caused by the laser beam generating means is corrected on said irradiated region.

3. A laser irradiating device comprising:

means for irradiating a linear laser beam;

means for irradiating the laser beam by scanning the laser beam in a direction having a predetermined angle (θ.) in respect of a direction of a width of the linear laser beam;

wherein the laser beam is provided with an intensity distribution periodically varied in a longitudinal direction of the laser beam;

wherein the laser beam is of a pulse oscillation type; and wherein pulses of the laser beam are irradiated by overlapping portions of the pulses at an irradiated region.

4. The laser irradiating device according to claim 3, wherein the angle θ is selected from a range satisfying $0.01 \leq |\tan \theta| \leq 0.3$.

5. A laser irradiating device comprising:

means for irradiating a linear laser beam;

means for irradiating the laser beam by scanning the laser beam in a direction having a predetermined angle θ (θ≠0°) in respect of a direction of a width of the linear laser beam;

wherein the laser beam is provided with an intensity distribution periodically varied in a longitudinal direction of the laser beam;

wherein the laser beam is of a pulse oscillation type;

wherein pulses of the laser beam are irradiated by overlapping portions of the pulses at an irradiated region; and wherein the angel θ is selected from a range where peaks of the periodic intensity distribution do not overlap.

6. The laser irradiating device according to claim 5, wherein the angle θ is selected from a range satisfying $0.01 \leq |\tan \theta| \leq 0.3$.

7. A laser irradiating device comprising:

laser beam generating means for forming a laser beam;

an optical system comprising means for dividing the laser beam and means for recombining divided laser beams in order to form a linear laser beam;

means for irradiating the linear laser beam by scanning the linear laser beam in a direction having a predetermined angle (0.) in respect of a width direction of a cross section of the linear laser beam;

wherein the laser beam is of a pulse oscillation type; and wherein pulses of the laser beam are irradiated by overlapping portions of the pulses at an irradiated region.

8. The laser irradiating device according to claim 7, wherein the angle θ is selected from a range satisfying $0.01 \leq |\tan \theta| \leq 0.3$.

9. A laser irradiating method comprising the steps of:

irradiating a linear laser beam of a pulse oscillation type having an intensity distribution periodically varied in a longitudinal direction of laser beam cross section;

scanning the laser beam in a direction having a predetermined angle (0.) respect of a direction of a width of the leaner laser beam cross section; and irradiating pulses of the laser beam by overlapping portions of the pulses at an irradiated region.

10. The laser irradiating method according to claim 9, wherein the angle θ is selected from a range where peaks of the periodic intensity distribution do not overlap.

11. The laser irradiating method according to claim 9, wherein the angle θ is selected from a range satisfying $0.01 \leq |\tan \theta| \leq 0.3$.

12. A device according to claim 1, wherein a length of said linear laser beam is larger than a region to be irradiated.

13. A device according to claim 3, wherein a length of said linear laser beam is larger than a region to be irradiated.

14. A device according to claim 5, wherein a length of said linear laser beam is larger than a region to be irradiated.

15. A device according to claim 7, wherein a length of said linear laser beam is larger than a region to be irradiated.

16. A method according to claim 9, wherein a length of said linear laser beam is larger than a region to be irradiated.

17. A device according to claim 1, a region to be irradiated is mounted on a X-Y stage and the X-Y stage is moved at a speed.

18. A device according to claim 3, a region to be irradiated is mounted on a X-Y stage and the X-Y stage is moved at a predetermined speed.

19. A device according to claim 5, a region to be irradiated is mounted on a X-Y stage and the X-Y stage is moved at a predetermined speed.

20. A device according to claim 7, a region to be irradiated is mounted on a X-Y stage and the X-Y stage is moved at a predetermined speed.

21. A device according to claim 9, a region to be irradiated is mounted on a X-Y stage and the X-Y stage is moved at a predetermined speed.

* * * * *